US011939236B2

(12) United States Patent
Yizhack et al.

(10) Patent No.: US 11,939,236 B2
(45) Date of Patent: *Mar. 26, 2024

(54) SYSTEM AND A METHOD FOR COMPREHENSIVE MONITORING, ANALYSIS AND MAINTENANCE OF WATER AND EQUIPMENT IN SWIMMING POOLS

(71) Applicant: MAYTRONICS LTD., Kibutz Yizrael (IL)

(72) Inventors: Tamir Yizhack, Kiryat Motzkin (IL); Shay Peretz, Shimshit (IL)

(73) Assignee: Maytronics Ltd., Kibbutz Yizrael (IL)

(*) Notice: Subject to any disclaimer, the term of this patent is extended or adjusted under 35 U.S.C. 154(b) by 0 days.

This patent is subject to a terminal disclaimer.

(21) Appl. No.: 17/674,584

(22) Filed: Feb. 17, 2022

(65) Prior Publication Data
US 2022/0169533 A1 Jun. 2, 2022

Related U.S. Application Data

(63) Continuation of application No. 16/474,757, filed as application No. PCT/IL2017/051404 on Dec. 29, 2017, now Pat. No. 11,286,177.

(Continued)

(51) Int. Cl.
C02F 1/00 (2023.01)
C02F 1/68 (2023.01)
(Continued)

(52) U.S. Cl.
CPC ............... *C02F 1/008* (2013.01); *C02F 1/68* (2013.01); *C02F 1/688* (2013.01); *C02F 3/348* (2013.01);
(Continued)

(58) Field of Classification Search
CPC ............ H04Q 2209/00; H04Q 2209/10; H04Q 2209/40; H04Q 2209/70; H04Q 2209/80;
(Continued)

(56) References Cited

U.S. PATENT DOCUMENTS 6,972,415 B2 12/2005 Schaible et al.
7,394,381 B2 7/2008 Hanson et al.
(Continued)

FOREIGN PATENT DOCUMENTS

WO 2016176169 A1 11/2016

OTHER PUBLICATIONS

Flipr, Flipr Plunges into the Heart of the Las Vegas CES 2017 with its predictive Connected Object for Swimming Pool Maintenance, 2016 (Year: 2016).*

(Continued)

*Primary Examiner* — Franklin D Balseca

(57) ABSTRACT

The present invention provides a method for comprehensive monitoring, analysis and maintenance of water and equipment in swimming pools, said method implemented by one or more processors operatively coupled to a non-transitory computer readable storage device, on which are stored modules of instruction code that when executed cause the one or more processors to perform: accumulating and monitoring data from elements including at least one of: sensors, actuators, and breakers in and around the vicinity of the swimming pools; accumulating non-sensory data from a plurality of sources at a local processing unit; propagating the data to an online remote server, applying machine learning or rule based algorithms at the online remote server configured to incorporate all the acquired data and obtain an optimal policy for pool maintenance by providing recommendations, control parameters, and providing an online interface to access said recommendation/control parameters (Continued)

for at least one of pool owners, pool servicemen, pool maintenance companies, pool vendors and pool retail dealers.

15 Claims, 15 Drawing Sheets

Related U.S. Application Data

(60) Provisional application No. 62/439,949, filed on Dec. 29, 2016.

(51) Int. Cl.
| | |
|---|---|
| *C02F 3/34* | (2023.01) |
| *C02F 103/42* | (2006.01) |
| *E04H 4/12* | (2006.01) |
| *H04L 67/02* | (2022.01) |
| *H04Q 9/00* | (2006.01) |

(52) U.S. Cl.
CPC ........... *E04H 4/1281* (2013.01); *H04L 67/02* (2013.01); *H04Q 9/00* (2013.01); *C02F 1/001* (2013.01); *C02F 2103/42* (2013.01); *C02F 2209/008* (2013.01); *C02F 2209/02* (2013.01); *C02F 2209/03* (2013.01); *C02F 2209/11* (2013.01); *C02F 2209/40* (2013.01); *E04H 4/1209* (2013.01); *H04Q 2209/10* (2013.01); *H04Q 2209/823* (2013.01)

(58) Field of Classification Search
CPC ......... H04Q 2209/82; H04Q 2209/823; H04Q 2209/826; H04Q 2209/84; H04Q 9/00; C02F 1/008; C02F 1/68; C02F 1/688; C02F 1/001; C02F 3/348; C02F 2103/42; C02F 2209/008; C02F 2209/02; C02F 2209/03; C02F 2209/11; C02F 2209/40; E04H 4/1281; E04H 4/1209; H04L 67/02
See application file for complete search history.

(56) References Cited

U.S. PATENT DOCUMENTS

| | | | |
|---|---|---|---|
| 8,212,222 B2 | 7/2012 | Shakespeare et al. | |
| 9,405,441 B2 | 8/2016 | Trafton et al. | |
| 9,470,563 B1 | 10/2016 | DeVerse | |
| 9,776,888 B1 | 10/2017 | Kurani et al. | |
| 9,834,451 B2* | 12/2017 | Miller | C02F 1/766 |
| 10,219,975 B2* | 3/2019 | Potucek | H04L 67/12 |
| 10,261,718 B1* | 4/2019 | Tummala | G06F 3/061 |
| 10,323,633 B2 | 6/2019 | Kochan, Jr. | |
| 10,604,954 B2* | 3/2020 | Shalon | G01N 33/1886 |
| 10,816,528 B2 | 10/2020 | Yizhack et al. | |
| 11,286,177 B2* | 3/2022 | Yizhack | C02F 3/348 |
| 2002/0035403 A1 | 3/2002 | Clark et al. | |
| 2011/0006904 A1 | 1/2011 | Duchamp et al. | |
| 2012/0158336 A1* | 6/2012 | Duchamp | C02F 1/008 |
| | | | 702/81 |
| 2014/0064139 A1 | 3/2014 | Mcqueen et al. | |
| 2014/0351642 A1 | 4/2014 | Bates et al. | |
| 2014/0127742 A1 | 5/2014 | Fiel | |

OTHER PUBLICATIONS

Flipr Plunges into the Heart of the Las Vegas CES 2017 with its Predictive Connected Object for Swimming Pool Maintenance Press Realease (2016).

International Search Report dated Mar. 13, 2018 for PCT/IL2017/051405.

International Search Report dated Apr. 16, 2018 for PCT/IL2017/051404.

\* cited by examiner

| | |
|---|---|
| Acquiring continuous monitoring of physical aspects of pool water quality (e.g., water level, temperature, water turbidity, and water pressure by module [2100] | 1110 |
| Acquiring continuous monitoring of chemical aspects of pool water quality (e.g., alkalinity, concentration of free Chlorine, concentration of Chlorine derivatives, concentration of Calcium, concentration of Cyanuric acid, water acidity, and water balance - trade-off between calcium hardness and corrosion, affected by factors such as pH level, calcium concentration, water alkalinity, temperature and Cyanuric acid concentration) by module [2200] | 1120 |
| Acquiring continuous monitoring of biological aspects of pool water quality (e.g., ORP-oxidation reduction potential, concentration of various strands of algae, concentration of other microorganisms, and the level of active disinfectants in water) by module [2300] | 1130 |
| Acquiring aspects of pool design (e.g., indoor / outdoor location, in-ground, or on-ground built pools, pool size (area and volume), geographic location, natural weather and climate, water heating, exposure to sunlight and UV radiation and pool water circulation rate ) by module [2400] | 1140 |
| Acquiring status of pool instruments (e.g., sensors, actuators, pumps and breakers) and detecting trends in the function of pool instruments (e.g., continuous rise in the power consumption of a pump ) by module [2500] | 1150 |
| Acquiring continuous environmental data (e.g.: weather data and forecasts, aerial photographs, actual rain downpour, cloud coverage, UV levels and temperature information) by module [2600] | 1160 |
| Acquiring the number of users continuously | 1170 |
| Acquiring the day of week and month of the year continuously | 1180 |

Obtaining from the data acquisition module 1100 at least part of the following data in respect to each swimming pool within the training set:

- The day of week and month of the year
- The number of user on that day
- The physical, chemical and biological aspects of the water
- Aspects of pool design
- Environmental data

1210

Training a machine learning algorithm in relation to all swimming pools in the training set, according to the obtained data, thus creating the "SLE classification model" which provides the output recommendations parameters based on numerical simulations.

The SLE receives continuous data via sensors and external sources such as weather data and forecasts. Based on such data the SLE is trained to incorporate dynamic factors for the parameters of interest in temporal models and simulates the behavior of various parameters throughout a predefined future period of time, estimating influences/effect in the future predefined time period on different parameters based on pre-defined parameters range (e.g the green zone), i.e., the SLE produces a trajectory of the "dynamics" of a parameter of interest in the pool, determines the desired value of said parameter at the end of the period which entails such trajectory, and calculates the amount of chemical(s) to be added to the pool at the beginning of the defined future period to set the value of said parameter in the pool. Thus, the SLE provides output recommendations that insure the pool is properly balanced and disinfected for a predefined period of time based on defined range values of pool parameters.

Using the SLE Model after the training stage, to produce recommendations parameters with regard to physical, chemical, biological aspects of the pool water, and the pool instruments. The SLE model provides recommendations parameters re adding the necessary chemicals to make sure the pool will be properly balanced and disinfected, repairing/replacing equipment such as pumps, sensors and the like.

The cloud server applies the SLE algorithm for:
devising an optimal pool maintenance instructions sets, for efficient water consumption and utilization of additive substances; educating pool maintenance professionals regarding the correct measures that need to be taken to ensure optimal water quality; empowering individuals with little or no record of pool maintenance, to understand the metrics and status of pool parameters, and take correct action whenever necessary.

1410

The cloud server incorporates an online interface, which facilitates different capabilities and provides access to information according to a user roles and authorization levels. For example:
- Pool owners are able to maintain their own pools,
- Pool service personnel are able to maintain multiple pools,
- Pool vendors and retail dealers may subscribe to obtain online information acquired from the plurality of local pool processing units.

1420

The user may correct the SLE Model when unexpected events affecting the pool water are about to take place. For instance, heavy rains, storms, big pool parties and the like. Such unexpected events may alter the balance in the pool with respect to physical, chemical and biological aspects.

SYSTEM AND A METHOD FOR COMPREHENSIVE MONITORING, ANALYSIS AND MAINTENANCE OF WATER AND EQUIPMENT IN SWIMMING POOLS

FIELD OF THE INVENTION

The presented invention generally relates to the field of water quality monitoring, and specifically to the fields of automated monitoring, treatment and management of the quality of water in swimming-pools, and the maintenance of swimming-pool equipment.

DISCUSSION OF RELATED ART

The field of swimming pool maintenance involves two conflicting approaches; one is of a multidisciplinary, innovative research for ever more efficient, ecologically friendly methods for maintaining pleasant, healthy pool water. The other approach is of the hands-on know-how service person, who has gained valuable experience in the field. A system that integrates the two approaches will benefit all role players; including pool owners, pool servicemen, pool maintenance companies, pool vendors and pool retail dealers.

SUMMARY OF THE INVENTION

The present invention discloses a method for obtaining an optimal pool maintenance policy according to the analysis of data, originating from multiple sources. This includes:
Sensory Data Sources:
Data input from a plurality of sensors, installed in a plurality of pool locations, accumulating data pertinent to at least one of:
  physical aspects of said pools' water quality,
  chemical aspects of said pools' water quality,
  biological aspects of said pools' water quality.
  instruments and machines of the said pools,
  Non-Sensory Data Sources:
  Non-sensory data, accumulated from a plurality of sources, pertinent to at least one of:
  pools' design parameters and characteristics,
  pools' required maintenance procedures,
  pools' location and environmental conditions,
  online weather forecasts and climatic data.
The method disclosed in the present invention comprises the steps of:
  a) accumulating data from the said plurality of sensors,
  b) accumulating said non-sensory data.
  c) propagating said data to an online server,
  d) applying machine learning and/or rule-based algorithms to incorporate all the acquired data and obtain an optimal policy for pool maintenance,
  e) providing an online interface for at least one of; pool owners, pool servicemen, pool maintenance companies, pool vendors and pool retail dealers
The said interface disclosed in the present invention accommodates at least one of;
  access to a comprehensive presentation of a specific pool's maintenance status and water quality parameters,
  notifications of pool status
  warnings of malfunction, and recommendations for actions,
  recommendations for pool maintenance action priorities,
  access to a database of pool statistics, and
  training and management of pool maintenance personnel to accomplish an optimal pool maintenance policy, in view of the big data accumulated from multiple pool sites.
The present invention provides a method for comprehensive monitoring, analysis and maintenance of water and equipment in swimming pools, said method implemented by one or more processors operatively coupled to a non-transitory computer readable storage device, on which are stored modules of instruction code that when executed cause the one or more processors to perform:
  accumulating and monitoring data from elements including at least one of; sensors, actuators, and breakers in and around the vicinity of the swimming pools:
  accumulating non-sensory data from a plurality of sources at a local processing unit;
  propagating said data to an online remote server,
  applying machine learning or rule based algorithms at the online remote server configured to incorporate all the acquired data and obtain an optimal policy for pool maintenance by providing recommendations, control parameters, and
  providing an online interface to access said recommendation/control parameters for at least one of: pool owners, pool servicemen, pool maintenance companies, pool vendors and pool retail dealers.
According to some embodiments of the present invention the online interface accommodating at least one of:
  i. access to a comprehensive presentation of a specific pool's maintenance status and water quality parameters,
  ii. notifications of pool status,
  iii. warnings of malfunction, and recommendations for actions,
  iv. recommendations for pool maintenance action priorities,
  v. access to a database of pool statistics, and
  vi. training and management of pool maintenance personnel to accomplish an optimal pool maintenance policy, in view of the big data accumulated from multiple pool sites.
According to some embodiments of the present invention the monitoring and accumulating said data is continuous and pertinent to at least one of physical, chemical and biological aspects of said swimming pools.
According to some embodiments of the present invention the accumulating said non-sensory data is pertinent to at least one of:
  a. said pools' design parameters and characteristics,
  b. said pools' required maintenance procedures.
  c. said pools' location and environmental conditions, and
  d. online weather forecasts and climatic data.
According to some embodiments of the present invention the recommendations or control parameters include at least one of: values for adding chemical or biological substances, recommendation for maintenance of repairing or replacing instruments of the pool system.
According to some embodiments of the present invention the optimal maintenance of the pool is defined by predefined range of values of the pool chemical and biological parameters.

According to some embodiments of the present invention the method further comprising the step of estimating pool future influences of weather behavior and planned activities at the pool on the values of chemical or biological substances within predefined future period and reevaluating the values of adding chemical or biological substances based on the estimated influences/effects, such that, said values of chemical or biological substances are within predefined range at the end of the predefined future period.

According to some embodiments of the present invention the method further comprising the step of correcting values for adding chemical or biological substances, based on new reported events, by calculating the influence of said new event on the balance of the chemical and biological parameters.

According to some embodiments of the present invention data is raw data, as received output signals of said sensors The present invention disclose a system for comprehensive monitoring, analysis and maintenance of water and equipment in swimming pools comprising of:
- a local processing unit monitoring and accumulating data from:
  - elements including at least one of sensors, actuators, and breakers in and around the vicinity of the swimming pools,
  - non-sensory data from a plurality of sources, and
- an online server, said online server receiving said data from said local processing unit, applying machine learning algorithms to incorporate said acquired data and obtain an optimal policy for pool maintenance, and providing an online interface for at least one of pool owners, pool servicemen, pool maintenance companies, pool vendors and pool retail dealers.

According to some embodiments of the present invention the online interface accommodates at least one of:
- vii. access to a comprehensive presentation of a specific pool's maintenance status and water quality parameters,
- viii. notifications of pool status,
- ix. warnings of malfunction, and recommendations for actions,
- x. recommendations for pool maintenance action priorities.
- xi. access to a database of pool statistics, and
- xii. training and management of pool maintenance personnel to accomplish an optimal pool maintenance policy, in view of the big data accumulated from multiple pool sites.

According to some embodiments of the present invention the local processing unit accumulating and monitoring said data that is continuous and pertinent to at least one of physical, chemical and biological aspects of said swimming pools.

According to some embodiments of the present invention said local processing unit accumulating and monitoring said non-sensory data is pertinent to at least one of:
- e. said pools' design parameters and characteristics,
- f. said pools' required maintenance procedures,
- g. said pools' location and environmental conditions, and
- h. online weather forecasts and climatic data.

According to some embodiments of the present invention the recommendations/control parameters include at least one of: values for adding chemical or biological substances, recommendations for maintenance of repairing or replacing instruments of the pool systems.

According to some embodiments of the present invention the optimal maintenance of the pool is defined by predefined range of values of the pool chemical and biological parameters.

According to some embodiments of the present invention the system further comprising decision module configured for estimating pool future influences of weather behavior and planned activities at the pool on the values of chemical or biological substances within predefined future period and reevaluating the values of adding chemical or biological substances based on the estimated influences/affects, such that, said values of chemical or biological substances are within predefined range at the end of the predefined future period. According to some embodiments of the present invention the systems further comprising decision module configured for correcting values for adding chemical or biological substances, based on new reported events, by calculating the influence of said new event on the balance of the chemical and biological parameters.

DESCRIPTION OF THE DRAWINGS

FIG. 9 is a flow diagram, depicting the function of the data acquisition module according to some embodiments of the present invention. This module resides within the server, and is configured to accumulate data pertaining to specific swimming pools.

FIG. 10 is a flow diagram depicting the functionality of the training module, according to some embodiments of the present invention. This module resides within the server, and is responsible for training a machine learning algorithm in relation to all swimming pools in the training set, based on the obtained data.

FIG. 11 is a flow diagram depicting the functionality of the SLE model after the training stage.

FIG. 12 is a flow diagram depicting the functionality of the decision module according to some embodiments of the present invention.

DETAILED DESCRIPTION OF SOME EMBODIMENTS OF THE INVENTION

Figure 1:
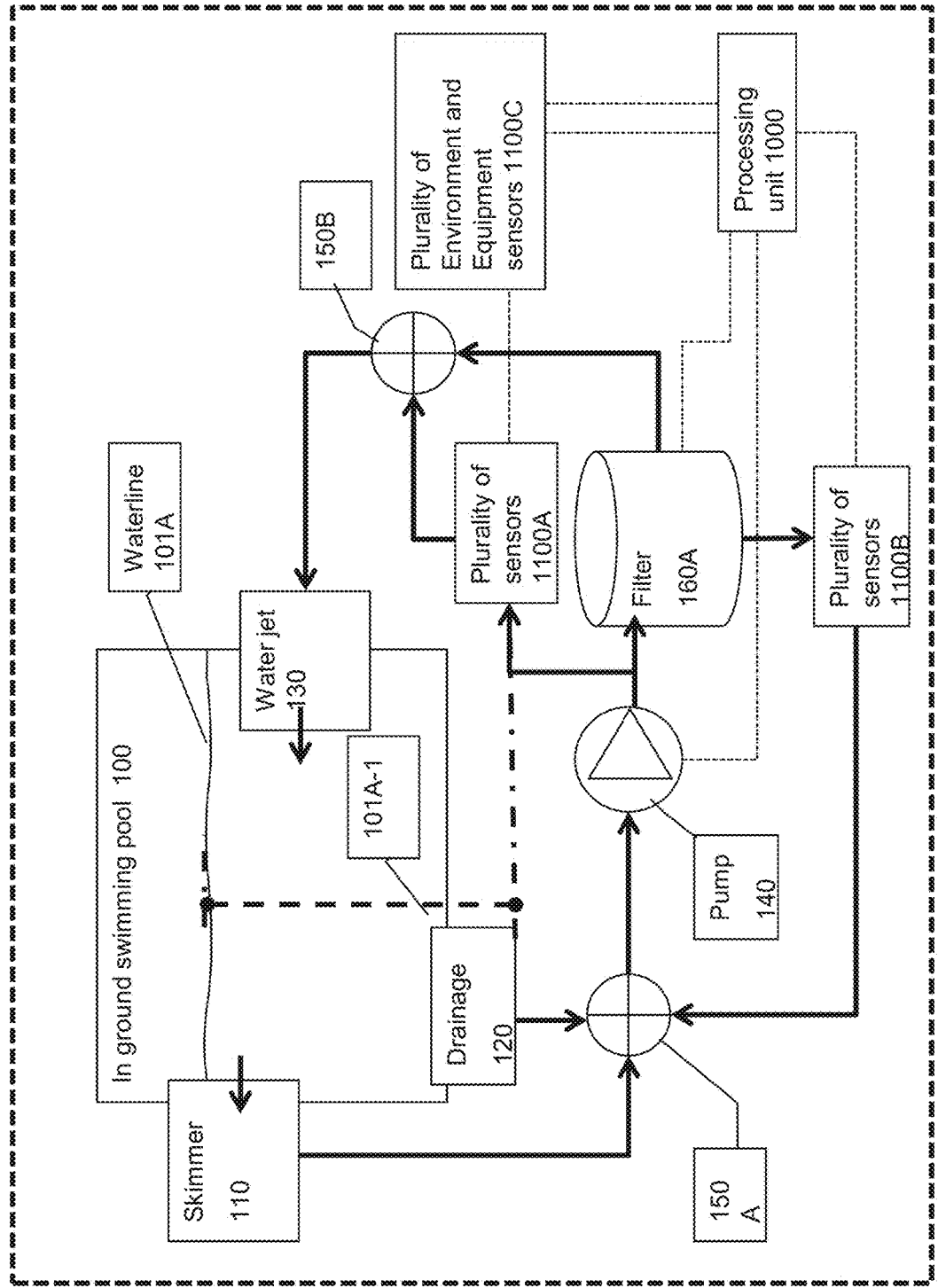
FIG. 1 presents a block diagram of the pool management and monitoring system, according to some embodiments of the present invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The present invention provides a system and a method for comprehensive monitoring, analysis and maintenance of all aspects related to swimming pool facilities and the quality of water in swimming pools.

Aspects of Pool Water Quality:

The system will relate to all Physical, Chemical and Biological aspects of pool water quality.

The physical aspects of pool water quality include:
Water level
Temperature
Water turbidity
Water pressure
The chemical aspects of pool water quality include:
Alkalinity
Concentration of free Chlorine
Concentration of Chlorine derivatives
Concentration of Calcium
Concentration of Cyanuric acid.
Water acidity
Water balance (trade-off between calcium hardness and corrosion, affected by factors such as pH level, calcium concentration, water alkalinity, temperature and Cyanuric acid concentration.)
The biological aspects of pool water quality include:
ORP (Oxidation Reduction Potential): the level of oxidation levels (which indicates the activity of fauna and flora)
Concentration of various strands of algae
Concentration of other microorganisms
The level of active disinfectants in the water. Free Chlorine is the most common disinfection agent in the market. Free Chlorine manifests as Hypochlorous acid (HOCl) and Hypochlorite (OCl—), the prior (HOCl) being preferred for its potency. In aqueous solutions HOCl will dissociate to H++OCl—. The relative concentration of HOCl, OCl—, and chloro cyanurates is governed by the solution's pH and Cyanuric Acid concentration; Acidic surroundings will maintain higher concentrations of HOCl.

Aspects of Pool Design: Parameters and Characteristics
The system will relate to the following aspects of a pool's design: Physical parameters, Circulation rate, Filtration.
Physical pool design parameters include:
Indoor/Outdoor location
In-ground, or on-ground built pools
Pool size (area and volume)
Geographic location
Natural weather and climate
Water heating
Exposure to sunlight and UV radiation
Pool water circulation rate:
is a function of the pool design, instruments, and operation (e.g., number of hours the pump is turned on, per 24 hours)
affects the processes of water filtration and disinfection
must comply with health regulations, dictating that the entire volume of pool water should be filtered within a stated period
must relate to all water layers, as various organisms dwell in different water depths.
Filtration:
Modern pools employ various measures of filtration. Each such measure relates to different types and sizes of floating particles and substances:
Skimmer baskets filter out large floating particles. The water line should normally reside in the ⅔ height of the basket for optimal effectiveness.
Cleaning robots filter the water and scrub pools surfaces.
Hair filters are designed to extract hovering particles (e.g. hairs).
The bulk of pool water filtration is normally performed by a central filter. The most common types of such filters are: Sand filters, Cartridge filters and DE (Diatomaceous earth) filters. Sand filters are the most ubiquitous of the three types. Sand filters normally filter out particles in excess of 15 micron in length.
Levels of Pool Monitoring and Management:
The present invention is unique in its approach to pool maintenance. It involves pool monitoring and management on three different levels.
The local level: A local processing unit monitors and manages various elements (e.g. sensors, actuators, breakers) in and around the local pool's vicinity
Remote monitoring and management of multiple pool systems: A cloud server remotely monitors and manages multiple pool systems, providing different access levels to various role players (e.g. pool owners, pool service people)
Big data mining and machine learning: The said cloud server performs algorithms of machine learning to extract optimal pool maintenance policies.
The functionality of each of these levels is further elaborated below
On the Local Pool Level:
The monitoring of pool parameters and management of pool maintenance actions is facilitated by a local processing unit. This processing unit is responsible for acquiring pool maintenance information from a plurality of sensors, and reporting the accumulated data to a cloud server.
The local processing unit:
Facilitates comprehensive, continuous or at determined time periods monitoring of every aspect of the pool water's quality: Physical, Chemical and Biological aspects (as elaborated above).

Continuously or at determined time periods monitors parameters which reflect the condition of the pool's maintenance, and status of pool instruments.

Detects trends in the function of pool instruments (e.g. continuous rise in the power consumption of a pump)

May produce warnings or recommendations for maintenance actions

Continuously correlates data, acquired from the plurality of sensors to indicate a fault in one of the pool's systems, and produce an alert regarding the suspected malfunction.

Actively carries out maintenance actions, as instructed via the cloud server

On the Cloud Server Level:

The Cloud Server aggregates the information flowing in from a plurality of local pool processing units.

This information serves to provide a high level, online, multiple pool status image for pool service professionals, and aid them in managing and prioritizing the actions that need to be taken in relation to the said plurality of pools.

The Cloud Server facilitates the application of remote maintenance and preemptive actions, by addressing specific local pool processing units. It alleviates pool service—personnel from the need to physically arrive at the respective pool.

The cloud server incorporates an online interface, which facilitates different capabilities and provides access to information according to a user roles and authorization levels. For example:

Pool owners are able to maintain their own pools,

Pool service personnel are able to maintain multiple pools,

Pool vendors and retail dealers may subscribe to obtain online information acquired from the plurality of local pool processing units.

On the Big Data Mining Level:

The Cloud Server aggregates physical and environmental information regarding each of the pools it is connected to. It holds all the data pertaining to pool design, location, measured water properties and pool properties, as well as environmental metrics, per each of these pools. It also has access to external data sources, such as weather data and forecasts, aerial photographs, actual Rain downpour, cloud coverage, UV levels and temperature information. Furthermore, the Cloud Server analyses the changes made to any of these properties, prior and after maintenance activity.

The aggregation and analysis of such big data enables the cloud server to:

Produce Analysis and prediction of data, based on empirical, historical information Apply data mining and machine learning algorithms, to devise an optimal pool maintenance policy. Produce optimized pool maintenance instructions sets, for efficient water consumption and utilization of additive substances.

Educate pool maintenance professionals regarding the correct measures that need to be taken to ensure optimal water quality.

Empower individuals with little or no record of pool maintenance, to understand the metrics and status of pool parameters, and take correct action whenever necessary.

Local Pool Management and Monitoring System

Figure 2:
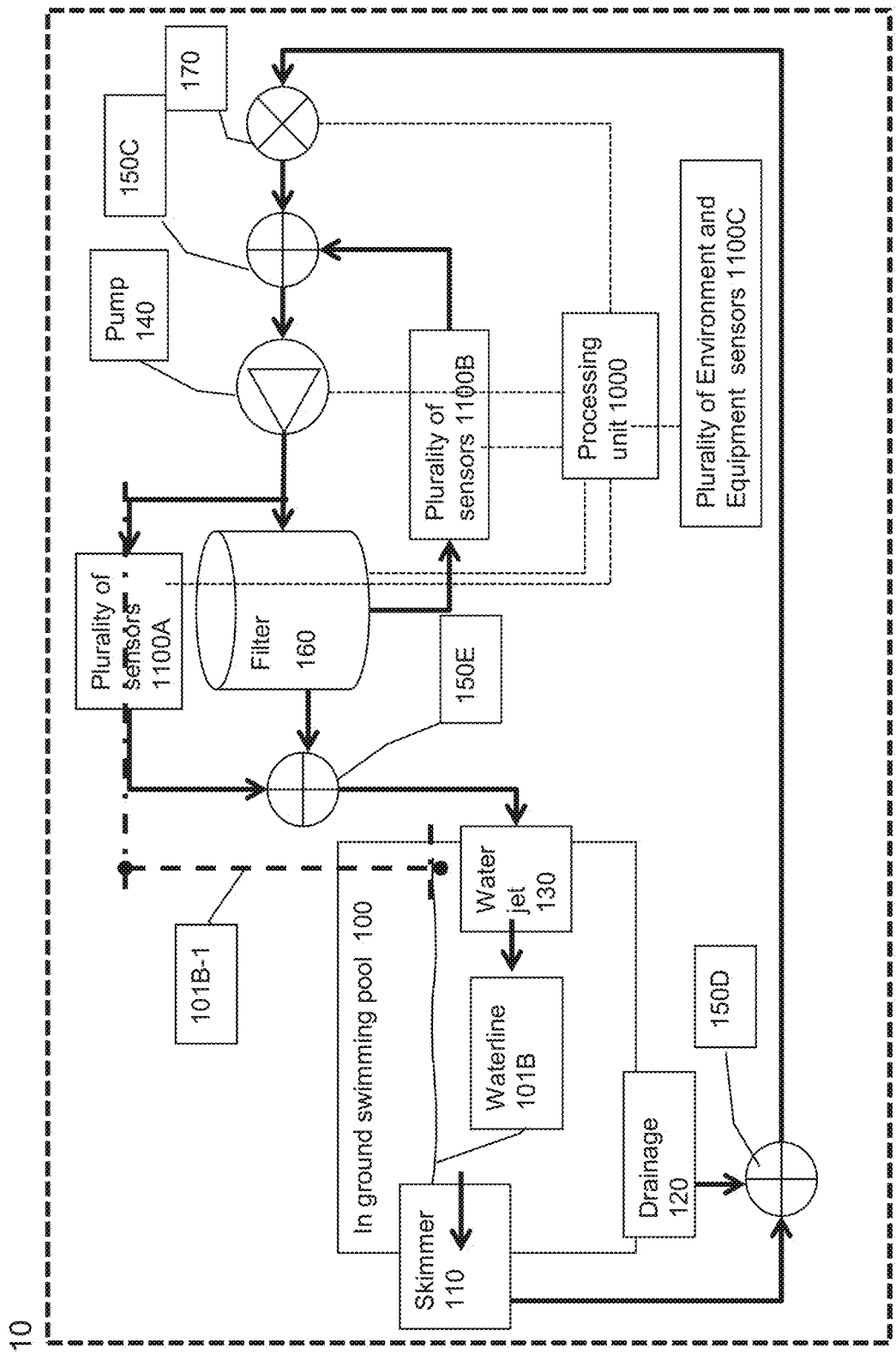
FIG. 2 presents a block diagram of the management and monitoring system, according to some embodiments of the present invention.

Figures 1 and 2 present schematic block diagrams of the pool monitoring and management system 10, in relation to two pool configurations, according to some embodiments of the present invention.

The diagram of FIG. 1 depicts an in-ground swimming pool, and the circulation of water out of and into the pool, where the water pump is located beneath the pool's water line. The components depicted in the diagram are:

The in-ground pool 100, filled with water up to the water level 101A

At least one skimmer 110 normally positioned on the ledge of the pool, such that approximately ⅔ of the skimmer is submerged beneath the water line.

A drainage opening 120 at the bottom of the pool

A plurality of sensors 1100A and/or 1100B and/or 1100C, the function of which is described further below.

A collection node 150A, collecting the water from at least one skimmer 110, the drainage opening 120 and the plurality of sensors 1100B.

A pump 140, circulating the pool water from the pool and back to it. In this embodiment, the pump is physically located beneath the water line 101A.

A filtering system 160, comprised of at least one of the following:
Sand filter
Cartridge filter
DE (Diatomaceous earth) filter A collection node 150B, collecting the water from the filtering system 160 and the plurality of sensors 1100A At least one water jet 130, typically positioned in a direction opposite that of the at least one skimmer 110, returning water to the pool, and applying water circulation.

A processing unit 1000.

The diagram of FIG. 2 depicts an in-ground swimming pool, and the circulation of water out of and into the pool, where the water pump is located above the pool's water line. The diagram depicts an in-ground swimming pool, and the circulation of water out of and into the pool. The components depicted in the diagram are:

The in-ground pool 100, filled with water up to the water level 101B

At least one skimmer 110 as described above

A drainage opening 120 at the bottom of the pool

A plurality of sensors 1100A and/or 1100B and/or 1100C, the function of which is described further below.

A collection node 150D, collecting the water from at least one skimmer 110 and the drainage opening 120.

A unidirectional valve 170

A pump 140, circulating the pool water from and back to the pool. In this embodiment, the pump is physically located above the water line 101B.

A filtering system 160, as described above

A collection node 150C, collecting the water from the unidirectional valve 170 and the plurality of sensors 1100B A collection node 150E, collecting the water from the filtering system 160 and the plurality of sensors 1100A At least one water jet 130, as described above.

A processing unit 1000, as described above.

The processing unit 1000 accumulates the information provided by the sensors (1100A, 1100B, 1100C), and analyzes it to form a comprehensive status representation of the pool system.

The processing unit 1000 propagates the accumulated data towards a cloud server (not depicted in FIG. 1 or 2) for further analysis and remote access. The functionality of the cloud server is discussed in relation to FIGS. 3a and 3b.

According to some embodiments, the processing unit 1000 may be configured to control specific actions that are to be performed by certain pool instruments. For example: the processing unit may be configured to initiate and control the action of sand-filter 160 backwash, in accordance to a command from a cloud server (not depicted in FIG. 1 or 2).

The monitoring of pool water quality and the accumulation of data respective of the system's functionality relies on a plurality of sensors. Some of these sensors are designed to be submerged in water, and sense specific qualities of the pool water (e.g. Temperature, Total dissolved solids. pH and pressure). Other sensors are designed to obtain information regarding the system's functionality (e.g. pump's power consumption, acoustics and vibrations), and will not necessarily be in direct contact with pool water. The location and configuration of each such sensor is specific to its function, and will be elaborated in the following paragraphs.

Location of Sensors

FIGS. 1 and 2 each present two options for the location of the plurality of sensors: 1100A and 1100B. These sensors are located on bypasses, around the pump 140 and the filtering system 160. The arrows present the direction of flow through the bypasses:
  Location 1100A: intakes water between the pump 140 and the filter 160, samples it, and returns it after the filter 160. This constellation involves unfiltered water and requires high maintenance but consequently also has the benefit of a high rate of detection.
  Location 1100B: intakes water after the filter 160, samples it and returns it before the pump's 140 inlet. This constellation involves filtered water and requires lower maintenance, but also provides a relatively low rate of detection.

The plurality of pool-environment and equipment-related sensors 1100C include a variety of sensors, as elaborated along this document. Examples for such sensors are:
  Cameras for capturing still images and/or video feeds
  Machine-specific power and/or current sensors,
  Ambient (e.g. temperature) sensors.

Figure 3A:
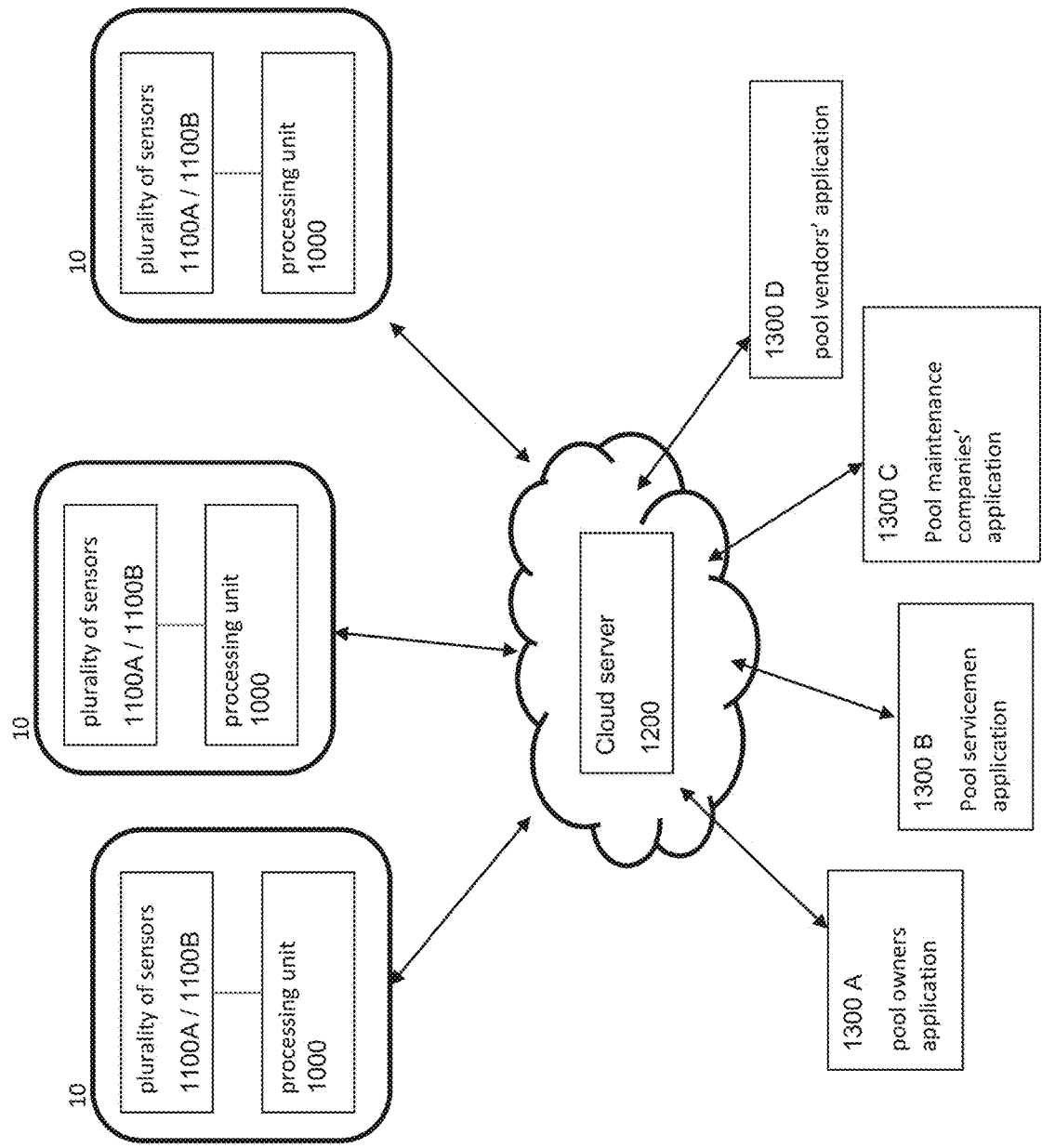
FIG. 3a presents a schematic block diagram, depicting the integration of the pool management and monitoring system within the constellation of a communication network according to one embodiment of the present invention.

The location of each such sensor is obviously specifically dictated by its function (e.g. water-pump current sensors would normally reside in the machines room). Consequently, the said sensors comprising 1100C may be located, for example, at:
  The pool's machines room
  The water skimmers
  Within a pool-cleaning robot
  In a casing, submerged or floating in the pool Pool Monitoring and Management; Interface with Cloud Server FIG. 3a presents a schematic block diagram, depicting the integration of the pool management and monitoring system 10 within the constellation of a network, according to one embodiment of the present invention.

A plurality of pool management and monitoring systems 10 are controlled by respective processing units 1000. Said processing units communicate via any type of data communication to a cloud server 1200. The plurality of processing units 1000 cumulatively provide pool-related big data to the central cloud server 1200.

The central cloud server 1200 processes the big data (e.g. by means of machine learning algorithms) to produce a suggested scheme of optimal pool maintenance. The said scheme will relate to at least one of the following:

Pool architecture (e.g. size, shape)
  Pool type (e.g. indoor/outdoor, on land/in ground)
  Geographic location
  Time of day
  Time of year (season)
  Ambient conditions (e.g. temperature, humidity)
  Public weather forecast (e.g. expected rain)
  The amount, timing and periodicity of substances that need to be added to tools (e.g. Chlorine tablets)
  Timing of required actions (e.g. sand filter back washing, water drainage, water addition)

The Cloud Server 1200 addresses various pool-related role players, such as pool owners 1300a, pool servicemen 1300b, maintenance companies 1300c and pool vendors and retail dealers 1300d. It may contact each of the said role players via any means of communication (e.g. mobile client applications, desktop applications).

The Cloud Server 1200 presents a unique online interface for each of these role players, and facilitates remote action capabilities according to role players' authorization level. For example:
  Residential pool owners 1300a:
  May access a comprehensive presentation of the pool's status.
  Possess comprehensive monitoring capabilities over individual features and properties that are monitored in and around their pool (e.g. water temperature, free Chlorine HOCl concentration etc.)
  Receive notifications, such as warnings of malfunction conditions (e.g. suspected pipe leak), and recommendations for actions (e.g. clear foliage from skimmer baskets).
  Are capable of remotely applying actions (e.g. add substances to the pool water, heat the pool, perform filter backwash)
  Pool maintenance companies and service professionals 1300b, 1300c:
  Possess the same capabilities as residential pool owners, with a scope extended to all the pools under their supervision.
  Prioritize pool maintenance actions
  Train and manage teams of pool maintenance personnel
  Access a database of pool statistics, and educate themselves of the optimal pool maintenance policy, in view of the big data accumulated from multiple pool sites.
  Maintain historical customer (pool owner) data Pool vendors and retail dealers 1300d involved in the procurement of various pool peripheral products, may also subscribe for the accumulated data, and benefit from the cloud server's 1200 conclusion of optimal pool maintenance policy.

Figure 3B:
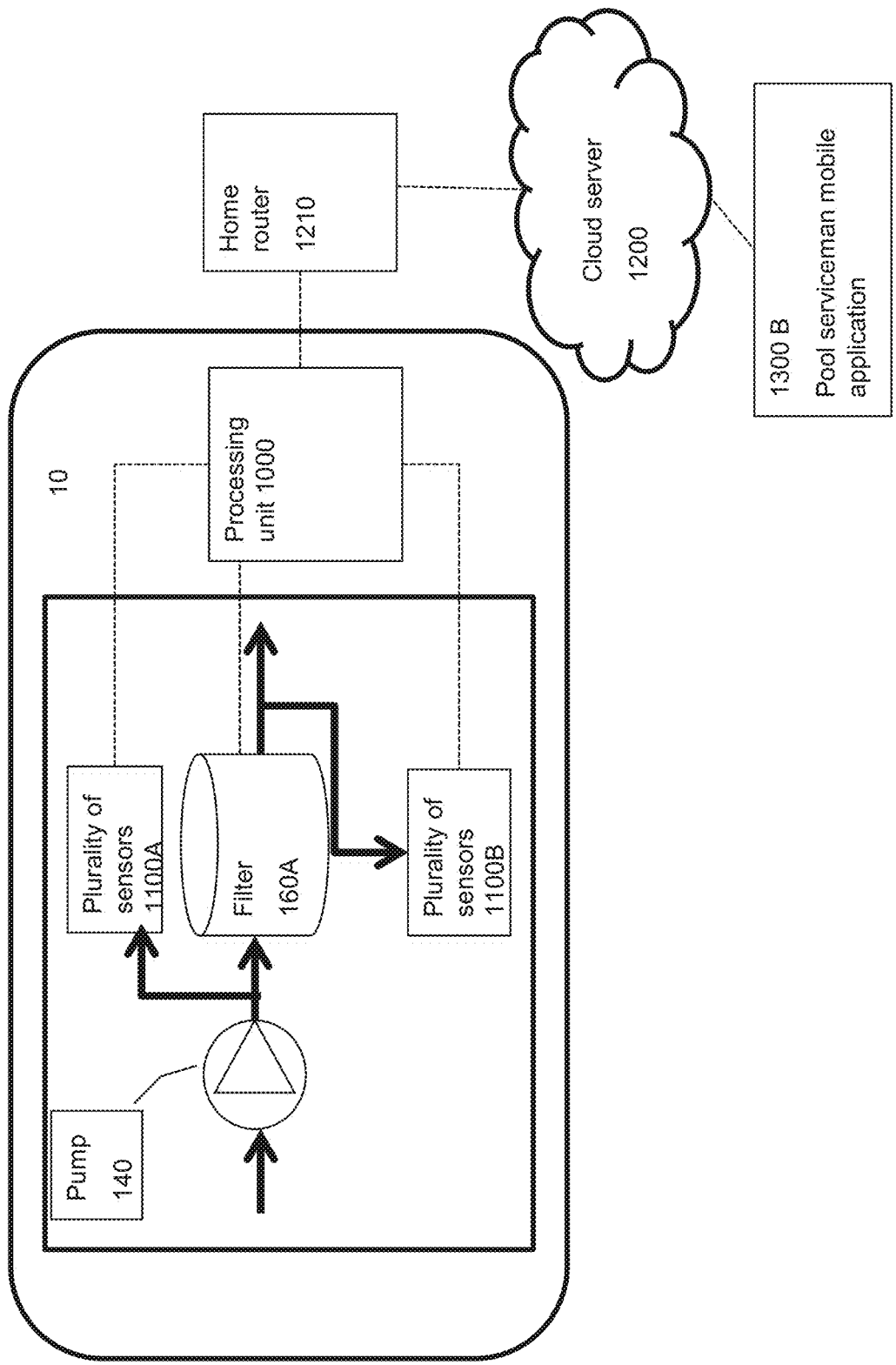
FIG. 3b presents an elaboration of the conceptual system depicted in FIG. 3a, and is brought here as a non-limiting example of such a system's implementation.

FIG. 3b depicts a non-limiting example for the implementation of the conceptual system brought in FIG. 3a. In this example:
  The processing unit 1000 monitors the influx of information from the plurality of sensors 1100A and 1100B, and propagates the information to a home router 1210 (e.g. over WiFi communication).
  The home router 1210 uploads this data onto the cloud server 1200.
  The cloud server 1200
    Analyzes the incoming information according to machine learning algorithms
    Produces a policy for optimal pool maintenance according to the said data (e.g. ascertain the amount of substances that need to be added to outdoor pools in a given time of year).

Produces notifications to predefined authorized users, (e.g. alerting pool servicemen of suspected malfunctions) over dedicated mobile applications 1300B Enables authorized users to apply remote pool maintenance actions (e.g. perform a sand filter back-wash, or add substances to the water)

Applications of Spectrometry

According to one embodiment of the present invention, the plurality of sensors 1100A or 1100B includes at least one spectrometer, active for detection of light absorbance, dispersion and fluorescence in at least one of the following spectral ranges:

NIR—Near infra Red

VIS—Visible light

UV—Ultra violet.

Figures 5A, 5B:
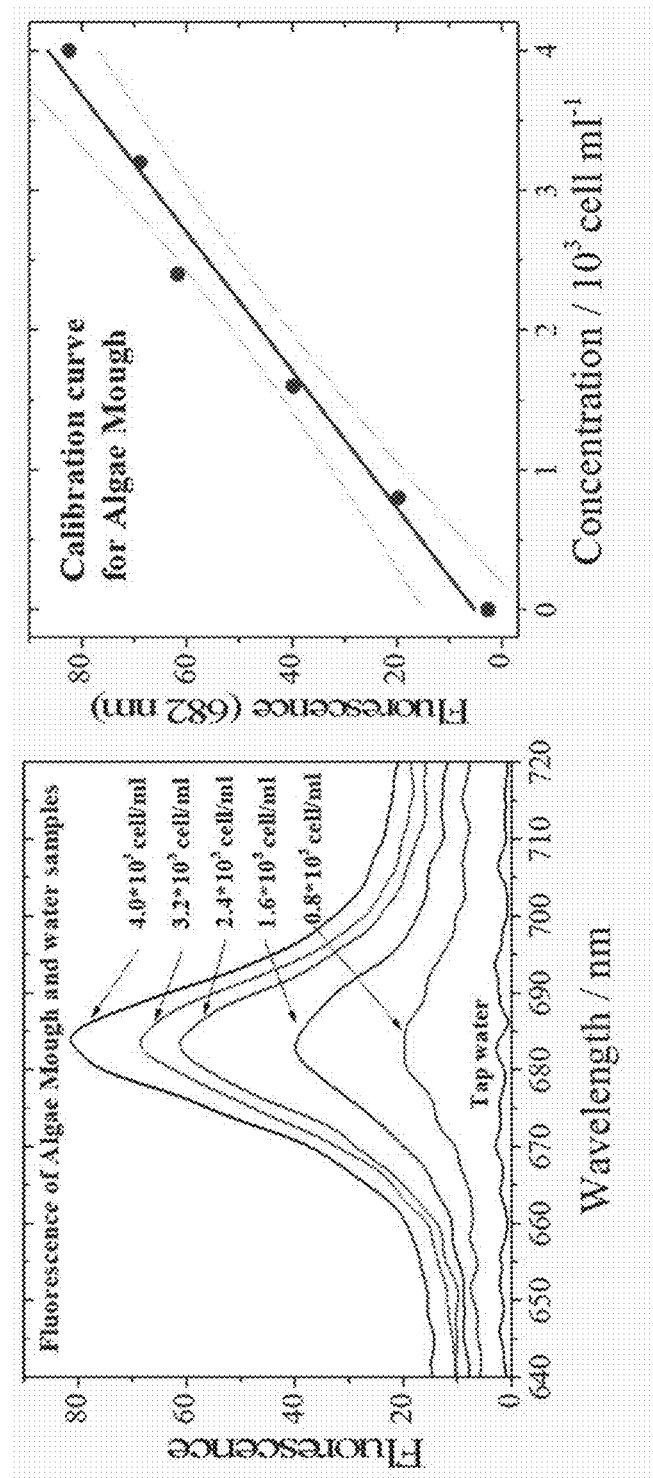
FIGS. 5A and 5B present empirical lab measurements, displaying the results of fluorescent light spectroscopy as a function of the concentration of algae in pool water samples.

FIGS. 5A and 5B present empirical lab measurements, displaying the results of fluorescent light spectroscopy as a function of the concentration of algae in pool water samples; FIG. 9A shows the spectral distribution of the detected fluorescence, and FIG. 9B shows the calibration curve for the algae —concentration detector at the wavelength of 682 nm.

Figure 6A:
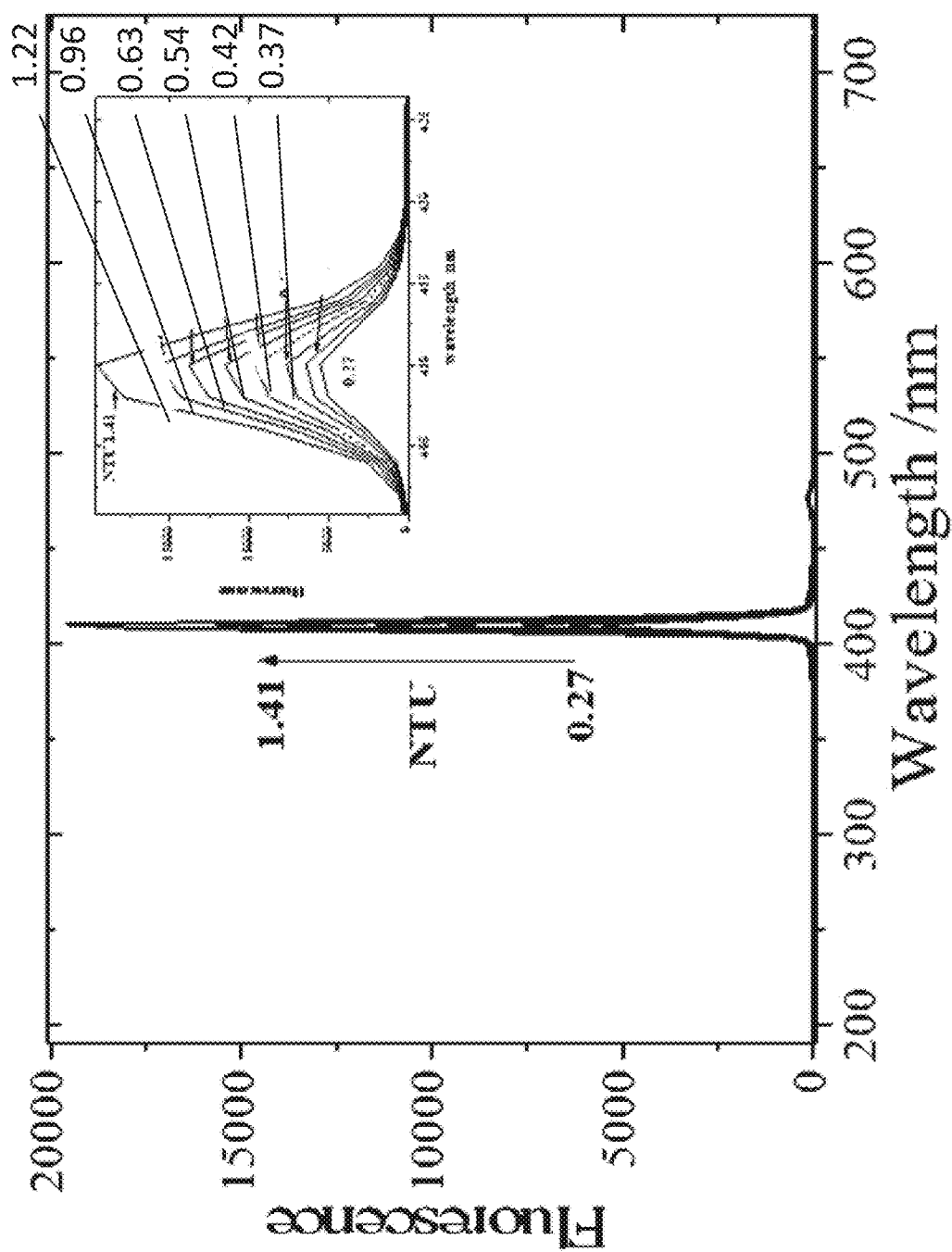
FIGS. 6A and 6B present empirical lab measurements, displaying the results of scattered light spectroscopy as a function of the turbidity of pool water samples.
Figure 6B:
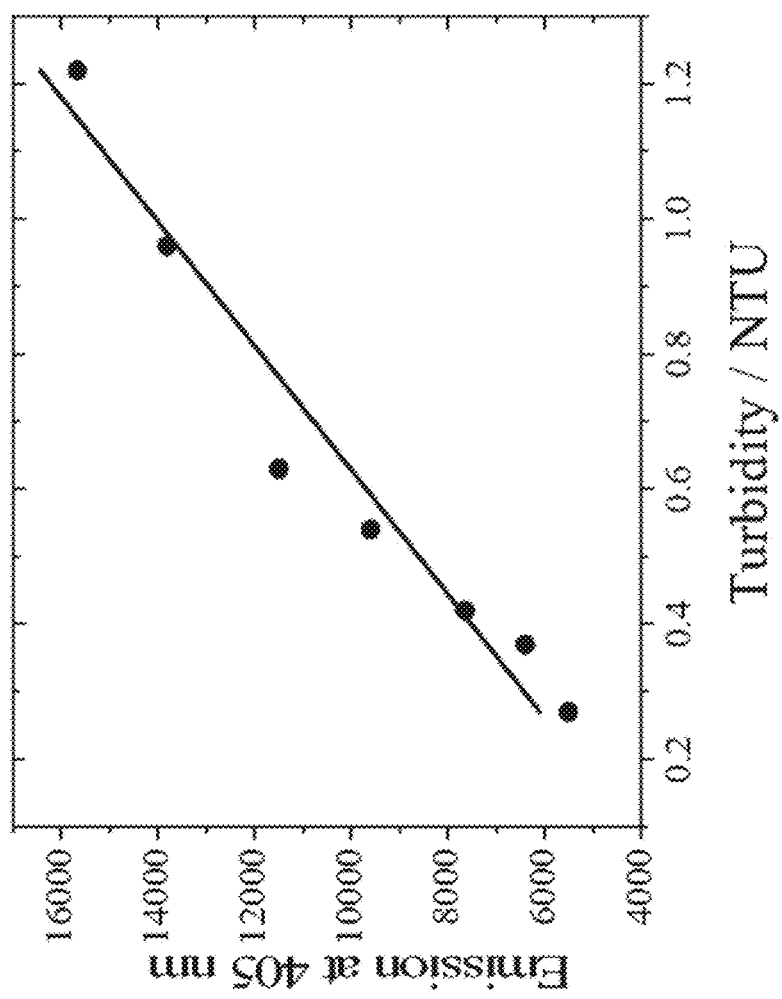

Concentration of Hypochlorite ($OCl^-$), by spectrometry in the UV range: FIGS. 6A and 6B present empirical lab measurements, displaying the results of absorbed light spectroscopy as a function of the concentration of Hypochlorite ($OCl^-$) in pool water samples; FIG. 11A shows the spectral distribution of the detected absorbance of light, and FIG. 11B shows the calibration curve for the $OCl^-$ concentration detector at the wavelength of 291 nm. Concentration of Cyanuric acid, by spectrometry in the UV range.

Figure 4:
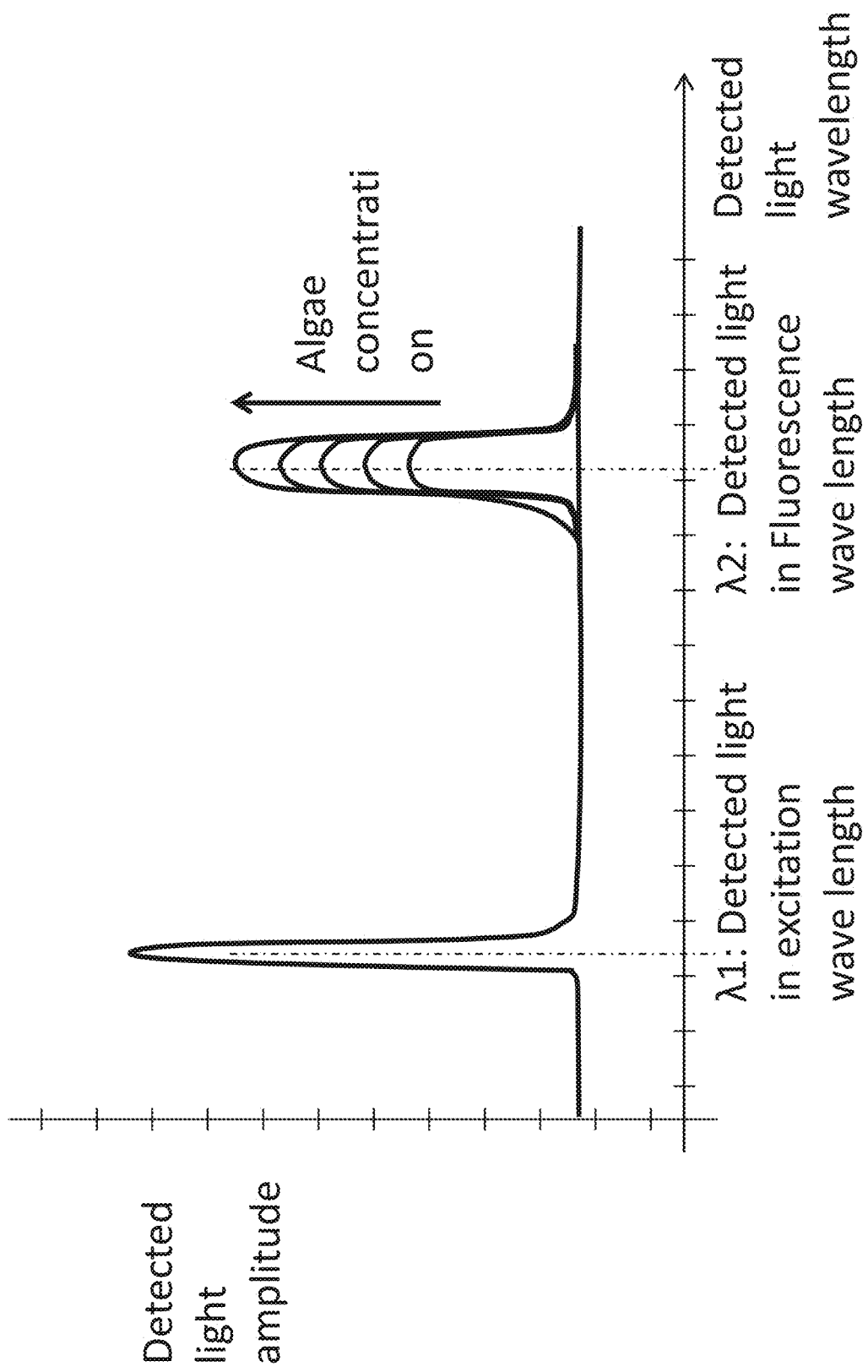
FIG. 4 presents a simplified graphic display of the quality of algae fluorescence.
Figure 7B:
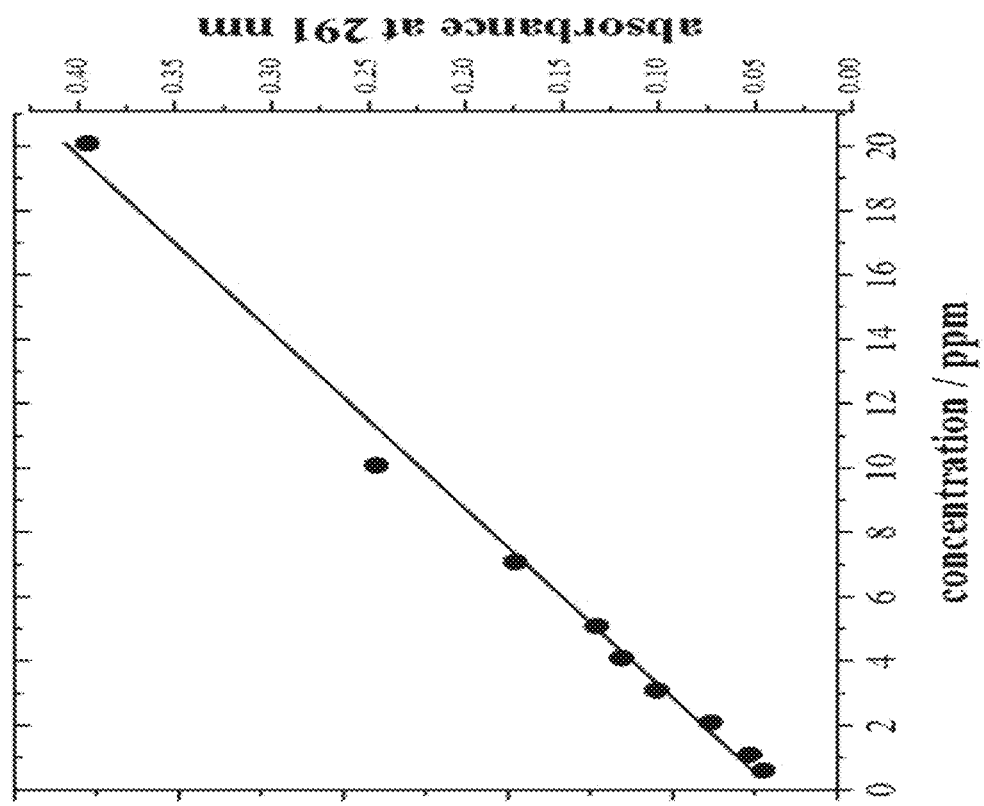
FIGS. 7A and 7B present empirical lab measurements, displaying the results of absorbed light spectroscopy as a function of the concentration of Hypochlorite ($OCl^-$) in pool water samples.
Figure 7A:
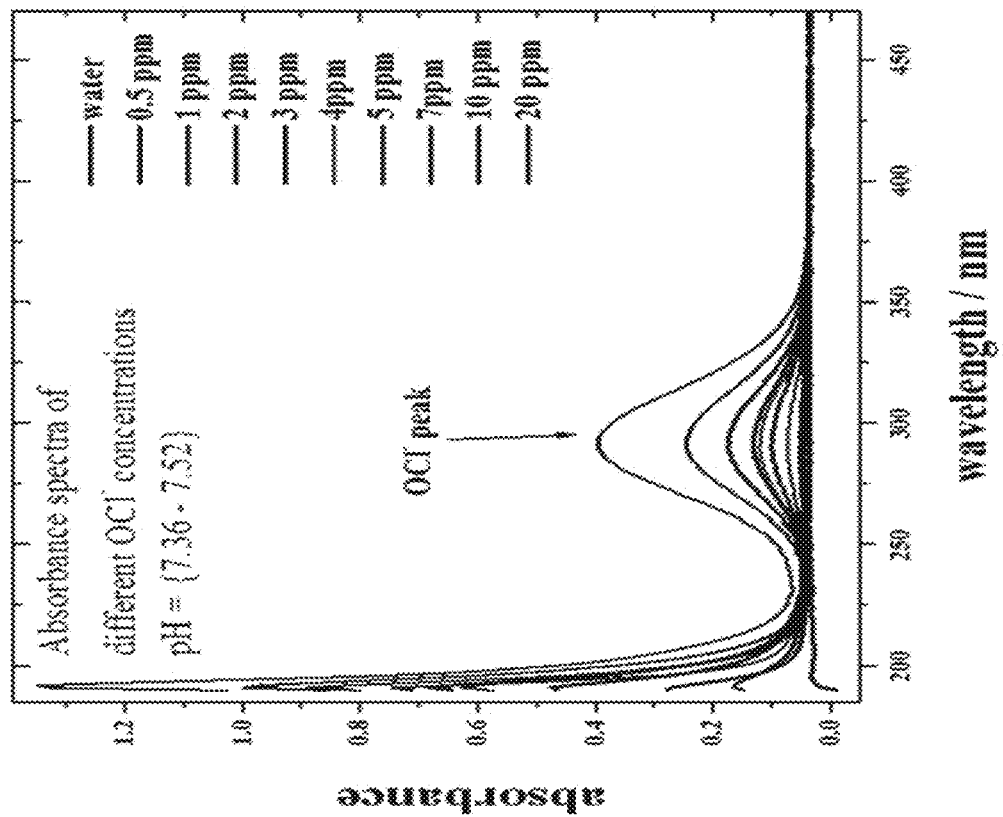

FIGS. 7A and 75B present empirical lab measurements, displaying the results of scattered light spectroscopy as a function of the turbidity of pool water samples. FIG. 10A shows the spectral distribution of the detected scattered light, and FIG. 10B shows the calibration curve for the turbidity detector at the wavelength of 405 nm FIG. 4 presents a simplified graphic display of the quality of algae fluorescence, and is already discussed above in relation to FIG. 4a.

Aspects of Pool Water Acidity

The present invention relates to several aspects of pool water acidity:

User experience: Pool water should be kept at a pleasant level of acidity.

Disinfectants: HOCl and OCl: The introduction of Chlorine to pool water produces HOCl and OCl—. HOCl is preferred as a more potent disinfectant [it is also less susceptible to photolysis by the sun's UV reaching earth]. The pH level in the water determines the ratio between these two products; lower pH raises the concentration of HOCl, whereas higher pH produces more OCl—.

Cyanuric acid. The sun's UV radiation dissolves HOCl, releasing Chlorine gas. Cyanuric acid is known as a stabilizer for Chlorine in swimming pools exposed to sunlight. It reduces Chlorine loss by protecting the free Chlorine in the pool from the sun's ultraviolet rays. As Cyanuric acid is continuously added to the water, its concentration rises. High levels of Cyanuric acid drop the efficacy of the Chlorine to act as a disinfectant, and Increase cloudiness in the pool water. The solution for a condition of high levels of Cyanuric acid is to dilute the pool water by disposing of large volumes of water.

According to one embodiment of the present invention, the plurality of sensors 1100A and/or 1100B includes Halochromic—based sensors for the measurement of pH levels in the pool water;

Halochromic materials are brought into contact with pool water.

The pH-sensitive Halochromic materials change their colour according to the pool water's acidity.

The change in colourization is monitored by the use of spectrometry within the visible light range, and thus the level of pH is determined.

Such Halochromic—based sensors are reusable, do not consume expensive reagents, and require little maintenance.

The monitored pH information is propagated to the Cloud Server 1200, which performs machine learning algorithms, and produces an optimal pool maintenance policy. This policy ensures that:

Pool water pH is maintained at the range of 7.2-7.4 pH, the maintenance is achieved by automatic or closing of acid.

The concentrations of Chlorine compounds and Cyanuric acid are kept optimal

Pool water is optimally consumed, avoiding unnecessary dumping of water.

Similar to pH, Alkalinity is related to the level of acidity of the pool water solution. It complements the pH information by expressing the potency of ions in the solution. Alkalinity is measured in the process of chemical titration, during which acid is gradually added to a basic pool water solution sample until neutral pH is reached.

Aspects of pool water alkalinity According to one embodiment of the present invention, the plurality of sensors 1100A and/or 1100B includes a Halochromic—based sensor for the measurement of Alkalinity in the pool water.

Titration is performed on a MEMS microlab apparatus, comprising of:

At least one micro pump for sampling a known volume of pool water

At least one other micro pump for applying minute amounts of acid to the sampled pool water, thus implementing the titration process A Halochromic indicator, brought in direct contact with the examined solution, and indicating the pH level by a change in its color A MEMS spectrometer, indicating the change in the colourization of the said Halochromic indicator, and hence ascertaining the pool water's Alkalinity.

The Alkalinity information is propagated to the Cloud Server 1200, which performs machine learning and/or rule-based algorithms, and produces an optimal pool maintenance policy. This policy ensures that:

The concentrations of Chlorine compounds and Cyanuric acid are kept optimal

Pool water is optimally consumed, avoiding unnecessary dumping of water.

Aspects of Pool Water Turbidity

As mentioned above, the turbidity of pool water is monitored by spectrometric methods. Turbidity affects the user's experience in two aspects: water quality and pool water maintenance:

1. Pool users obviously better enjoy clear, particle free water.
2. Due to normal operation over time, the pool's sand filter becomes occluded. At this stage a filter backwash maintenance action is required. During this process, water is pumped in the opposite direction to the normal filter's activity, to hover the filtered particles, and drain them out of the pool. Normally, water clarity is observed to monitor the progress of the backwash process. The introduction of spectrometric water turbidity monitoring (as mentioned above) enables performing the backwash automatically and accurately.

Pool water turbidity data is propagated to the Cloud Server 1200.

During normal operation the Cloud Server 1200 closely monitors the water's quality, and may alert pool maintenance person in case of a problem.

The Cloud Server 1200 may induce a backwash action, according to predefined logic. In this case, the Cloud Server 1200 will order the local processing unit 1000 to implement the backwash, and resume normal filter activity (end the backwash) independently, according to turbidity level readings.

Aspects of Pool Water Oxidation Reduction Potential (ORP)

According to one embodiment of the present invention, the plurality of sensors 1100A or 1100B includes an Oxidation Reduction Potential (ORP) sensor. This sensor measures the Oxidation Reduction Potential, and thus indicates the concentration of oxygen-consuming biological contaminants (e.g. Bacteria) in the water. This data is propagated to the Cloud Server 1200 in conjunction with additional information such as the concentration of dissolved disinfectant agents in the pool water. The Cloud Server 1200 performs machine learning and/or rule-based algorithms, and produces recommendations and instructions for optimal pool water maintenance, ensuring an acceptable level of biological contaminants according to health regulations.

According to some embodiments of the present invention, the plurality of sensors 1100A and/or 1100B includes at least one pressure sensor, the applications of which are numerous. The pressure sensor may indicate:

The pool's water level.

Required upcoming maintenance (e.g. Filter maintenance)

Malfunction (e.g. Leakage)

Erroneous practice (e.g. closure of wrong valve)

Application of TDS (Total Dissolved Solids) Measurement

According to some embodiments of the present invention, the plurality of sensors 1100A and/or 1100B includes a conductivity sensor, extracting the TDS (Total Dissolved Solids) parameter, which is in fact the level of electrolytic solvents in the pool water solution. This information is propagated to the Cloud Server and analyzed alongside accumulated historical pool maintenance information, as part of acquiring an optimal pool maintenance policy.

Application of Temperature Measurement

According to some embodiments of the present invention, the plurality of sensors 1100A and/or 1100B includes a temperature sensor. There are two aspects to the pool's temperature:

1. Pool owners and users obviously require the pool to be maintained in a pleasant temperature during periods of activity.

2. The temperature itself affects various measurements of pool water, such as calcium hardness and free chlorine concentration.

The pool's temperature is continuously or at determined time periods measured and reported to the Cloud Server. The Cloud Server:

Facilitates an interface for pool owners to control the pool's temperature

Gathers pool temperature information along with other data (e.g. UV exposure, level of algae concentration, concentration of substances in the pool). It applies machine learning and/or rule-based algorithms and produces an optimal policy for pool heating in terms of power consumption and pool water components.

Application of Power and/or Current Measurement

According to some embodiments of the present invention, the plurality of pool-environment and equipment-related sensors 1100C incorporates at least one current or power sensor, monitoring the current and/or power consumption of various pool instruments. Current and/or Power consumption monitoring indicates the status of the said pool instruments, verifies their correct operation, and serves as an alert in the case of malfunction or erroneous maintenance.

The current and/or power consumption measurements are accumulated by the local pool's processing module 1000, and therefrom propagated to the Cloud Server. The server correlates the current and/or power consumption measurements with additional information obtained from other sensors, to provide insight on the operation of the said electrical instrument. The following are examples for applications of current measurement in respect to various pool instruments:

Divergence from normal current consumption of the water pump, in conjunction with excessive detected noise from that pump, may indicate a mechanical malfunction in the pump.

A rise in the water pump's electric current consumption in addition to a rise in the water pressure at the sand filter's intake point may indicate that a sand filter is becoming occluded, and requires a filter backwash.

A change in the electric current consumed by a Chlorine generator unit may indicate required maintenance, e.g. due to the accumulation of calcium on the Chlorine generator's electrodes.

Image and Video Sensors: Assessment of the Number of Pool Occupants

According to some embodiments of the present invention, the pool monitoring and management system 10 includes additional pool-environment sensors 1100C, such as video and image sensors (e.g. single (2-D) cameras, stereoscopic (3-D) cameras). This information is employed to produce 2-D or 3-D images of the pool and its occupants, and is further analyzed by the local pool's processing module 1000 to determine the number of swimmers, optionally thermal cameras are used, for night-swimming operation, and due to privacy considerations]

The number of swimmers parameter is propagated to the Cloud Server 1200, and is included in its machine learning and/or rule-based algorithms. For example, the Cloud Server may ascertain the effect of the number of swimmers on the ORP (Oxidation Reduction Potential), and the proliferation of bacteria in pool water, and deduce the required amount of additive disinfectant substances.

Image and Video Sensors: Additional Applications

According to another embodiment of the present invention, the video and image data produced by the said pool-environment and equipment-related sensors 1100C is analyzed by the local processing unit 1000, to extract additional pool-related information such as:

Pool water level

Pool water clarity

Existence of floating items (e.g. foliage)

Pool control panel indications readings (e.g. warning LED)

Mechanical gauge readings (e.g. water flow gauge)

Condition of stopcocks (open/shut)

Normal operation of pool instruments, e.g.:
Absence of leakage in specific locations
Chlorine-generator functionality (chlorine-generators emit bubbles during normal operation)

The result of the said analysis is propagated to the Cloud Server 1200, where it is incorporated in the cloud server's 1200 machine learning and/or rule based algorithms. For example, the reading of a specific pump's pressure gauge may be identified through an image analyzing algorithm on the local processing unit 1000, and the correct functionality of that pump would be verified by machine learning or rule based algorithms on the Cloud Server 1200.

According to one embodiment, the images or video feeds propagated to the Cloud Server 1200 are made available online to different role players (e.g. Pool owners, pool maintenance person) for visual inspection of the regions of interest around the pool.

Application of Ambient Sensors

According to some embodiments of the present invention, the pool-environment, and equipment-related sensors 1100C include ambient sensors, designed to monitor data regarding ambient conditions in the pool's vicinity, such as:
Ambient temperature
Ambient humidity
Ambient lighting (UV exposure)

The said ambient data is propagated to the local pool's processing unit 1000, and therefrom to the Cloud Server 1200.

The Cloud Server 1200;
Facilitates the presentation of the pool pool-environment data over an online interface.
Includes the ambient data in its machine learning or rule based algorithms, and utilizes it to produce an optimal pool maintenance policy. For example, the system may deduce the optimal quantity of pool additive substances (e.g. chlorine tablets) required, given specific ambient conditions (e.g. sunlight UV exposure).

Application of External Data Sources

According to some embodiments of the present invention, the Cloud Server 1200 has access to external data sources, such as:
public weather data and forecasts,
aerial photographs,
actual rain downpour,
cloud coverage,
UV levels and
temperature information.

The Cloud Server 1200 includes the external data in its machine learning algorithms, and utilizes it to produce an optimal pool maintenance policy. For example, the system may deduce the optimal amount of water to be added to an outdoor pool, given actual rain downpour and expected rain according to weather forecasts.

According to some embodiments of the present invention, the Cloud Server 1200 analyses the changes made to any of the pool water properties, over a long period of time, prior to and after maintenance activity. This analysis serves as a feedback for the process of training and calibration of the algorithms, and fine-tunes the concluded maintenance policy recommendations over time.

Figure 8:
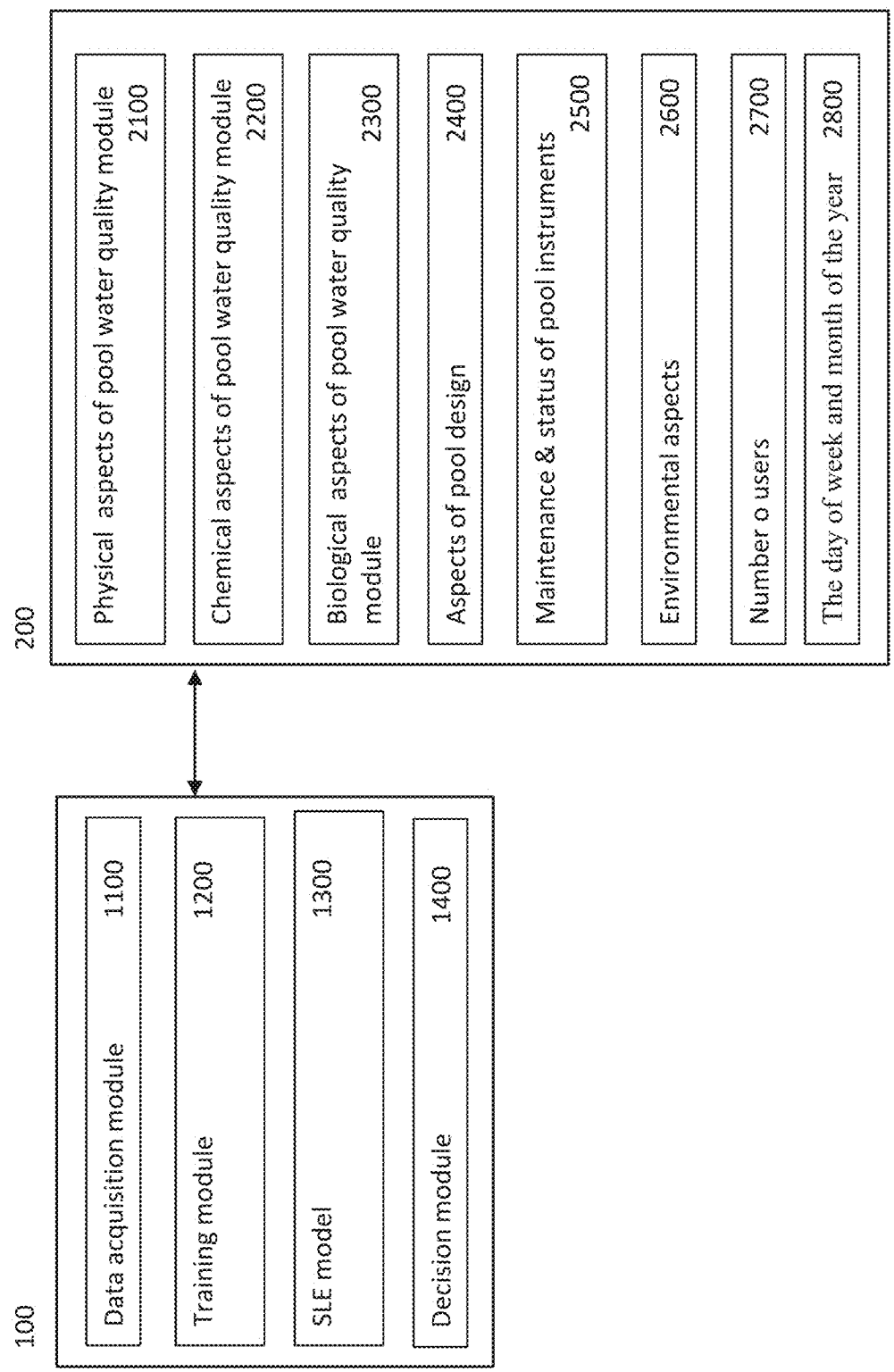
FIG. 8 is a block diagram, depicting a high level overview of the proposed system, wherein a plurality of modules extracts data pertaining to specific swimming pools, and propagate said data to a main server according to some embodiments of the present invention.

FIG. 8 is a block diagram, depicting a high level overview of the proposed system, wherein a plurality of training set swimming pool modules extract information pertaining to physical, chemical, and biological aspects of swimming pools in addition to aspects of pool design, maintenance & status of pool instruments, and environmental aspects and propagate this data to a main server according to some embodiments of the present invention.

The training set swimming pool module 200 is a module implemented in software or hardware or any combination thereof, installed at the location of monitored swimming pools.

The training set swimming pool module 200 is configured to interface the server module 100 using any type of wired or wireless data communication standard (e.g. LAN, WAN, WiFi, GSM, 3GPP, LTE etc.), and convey to the server 100 data pertaining to a specific swimming pool.

The Training set swimming pool module(s) 200 is comprised of at least one of the following sub modules:
Physical aspects of pool water quality module 2100,
Chemical aspects of pool water quality module 2200,
Biological aspects of pool water quality module 2300,
Aspects of pool design 2400,
Maintenance & status of pool instruments 2500, and
Environmental aspects 2600.

The server 100 is a module implemented in software or hardware or any combination thereof, configured to interface a plurality training set swimming pool modules 200 which are installed at the location of monitored swimming pools.

The server module includes several sub modules, configured to accumulate data, analyze the data, and ascertain whether specific aspects of the swimming pool is properly balanced and disinfected. The said sub-modules include at least one of the following:
The data acquisition module 1100;
The training module 1200;
The SLE model 1300; and
The decision module 1400.

The data acquisition module 1100 accumulates real-time data from the plurality of training set swimming pool modules, and stores it in a database for further processing, said data including at least one of:
the day of week and month of the year;
water level, temperature, water turbidity, and water pressure;
alkalinity, concentration of free Chlorine, concentration of Chlorine derivatives, concentration of Calcium, concentration of Cyanuric acid, water acidity, and water balance—trade-off between calcium hardness and corrosion, pH level, water alkalinity, temperature and Cyanuric acid concentration;
ORP-oxidation reduction potential, concentration of various strands of algae, concentration of other microorganisms, and the level of active disinfectants in water:
indoor/outdoor location, in-ground, or on-ground built pools, pool size (area and volume), geographic location, natural weather and climate, water heating, exposure to sunlight and UV radiation and pool water circulation rate;
pool instruments such as sensors, actuators, pumps and breakers;
detected trends in the function of pool instruments such as continuous rise in the power consumption of a pump;
continuous or at determined time periods environmental data such as weather data and forecasts, aerial photographs, actual rain downpour, cloud coverage, UV levels and temperature information: and
the number of users.

FIG. 9 is a flow diagram, depicting the function of the data acquisition module 1100 according to some embodiments of the present invention. This module resides within the server 100, and accumulates data pertaining to specific swimming pools. The data acquisition module 1100 aggregates and stores at least part of the following data in a database for further analysis:

Data of physical aspects of a specific swimming pool is continuously or at determined time periods acquired from the physical aspects of pool water quality module [2100] step (1110).

Data of chemical aspects of a specific swimming pool is continuously or at determined time periods acquired from the chemical aspects of pool water quality module [2200] step (1120).

Data of biological aspects of a specific swimming pool is continuously or at determined time periods acquired from the biological aspects of pool water quality module [2300] step (1130).

Data related to the design of a specific swimming pool is acquired from the aspects of pool design module [2400] step (1140).

Data related to the status of the instruments of a specific swimming pool is acquired from the maintenance & status of pool instruments module [2500] step (1150).

Environmental data of a specific pool location is acquired from environmental aspects module 126001 step (1160).

The number of users of a specific swimming pool on a specific date is acquired from module [2700] step (1170).

The day of week and month of the year is acquired from module [2800] step (1180).

FIG. 10 is a flow diagram depicting the functionality of training module 1200 according to some embodiments of the present invention. (step 1210).

The training module 1200 resides within the server 100 and responsible for training or calibrating a machine learning and/or rule based algorithm in relation to all swimming pools in the training set based on the obtained data as follows:

The day of week and month of the year
The number of users on that day
The physical, chemical and biological aspects of the water
Aspects of pool design
Environmental data Based on the accumulated data, a machine learning and/or rule based algorithm is trained, in relation to all swimming pools in the training set. The created "SLE classification model" provides the output recommendations/control parameters based on numerical simulations (step 1220) to maintain pool parameters within predefined range of values. For example, a machine learning algorithm may be implemented as an artificial neural network (ANN). The ANN target is to maintain chemical and biological parameters within pre-defined values, by learning to estimate the values of adding to the pool, chemical and biological substances based on all accumulated data.

The output recommendations/control parameters may include at least one of the following: values for adding chemical or biological substances, recommendation for maintenance of repairing or replacing instruments of the pool system.

In accordance with some embodiments of the present invention, the SLE receives continuous or at determined periods data via sensors and external sources such as weather data and forecasts. Based on such data the SLE is trained to incorporate dynamic factors for the parameters of interest in temporal models and simulates the behavior of various parameters throughout a future predefined period of time, estimating influences/effects in the future predefined time period on different parameters based on pre-defined parameters range (e.g., the green zone), i.e., the SLE produces a trajectory of the "dynamics" of a parameter of interest in the pool, determines the desired value of said parameter at the end of the pre-defined period, which entails such trajectory, and calculates the amount of chemical(s) to be added to the pool to set the value of said parameter in the pool at the beginning of the pre-defined future. Thus, the SLE provides output recommendations that ensure the pool is properly balanced and disinfected for a predefined period of time.

In accordance with some embodiments of the present invention, the SLE model receives continuous raw data via sensors and external sources such as weather data and forecasts and does not process/translate the data into physical parameters prior to simulating and providing output recommendations for treatments. Instead, the SLE model is trained to use raw data as received, such as for instance, continuous sensors' signals and use such signals as input data in simulations.

FIG. 11 is a flow diagram, depicting the function of the SLE model after the training stage (step 1310).

The SLE Model is used after the training stage to produce recommendations with regard to physical, chemical, biological aspects of the pool water, and the pool instruments. The SLE model provides recommendations re adding the necessary chemicals to make sure the pool will be properly balanced and disinfected based on predefined range values, repairing/replacing equipment such as pumps, sensors and the like.

FIG. 12 is a flow diagram, depicting the functionality of the decision module 1400 according to some embodiments of the present invention. This module resides within server 100 which applies the SLE algorithm to (1) devise an optimal pool maintenance instructions sets for efficient water consumption and utilization of additive substances, (2) educate pool maintenance professionals regarding the correct measures that need to be taken to ensure optimal water quality, and (3) empower individuals with little or no record of pool maintenance to understand the metrics and status of pool parameters and take correct action whenever necessary (step 1410).

Server 100 incorporates an online interface, which facilitates different capabilities and provides access to information according to a user roles and authorization levels. For example:

Pool owners are able to maintain their own pools.
Pool service personnel are able to maintain multiple pools,
Pool vendors and retail dealers may subscribe to obtain online information acquired from the plurality of local pool processing units (step 1420).

In accordance with some embodiments of the present invention, the user may correct the SLE Model when unexpected events affecting the pool water are about to take place. For instance, heavy rains, storms, big pool parties and the like. Such unexpected events may alter the expected balance in the pool with respect to physical, chemical and biological aspects (step 1430), and thus, based on reported unexpected events is performed correction of the SLE model based on calculation of events influences/affects on values of chemical and biological to be added to the pool in order to keep the pool balanced in spite of such events based on predefined range values.

Figure 13:
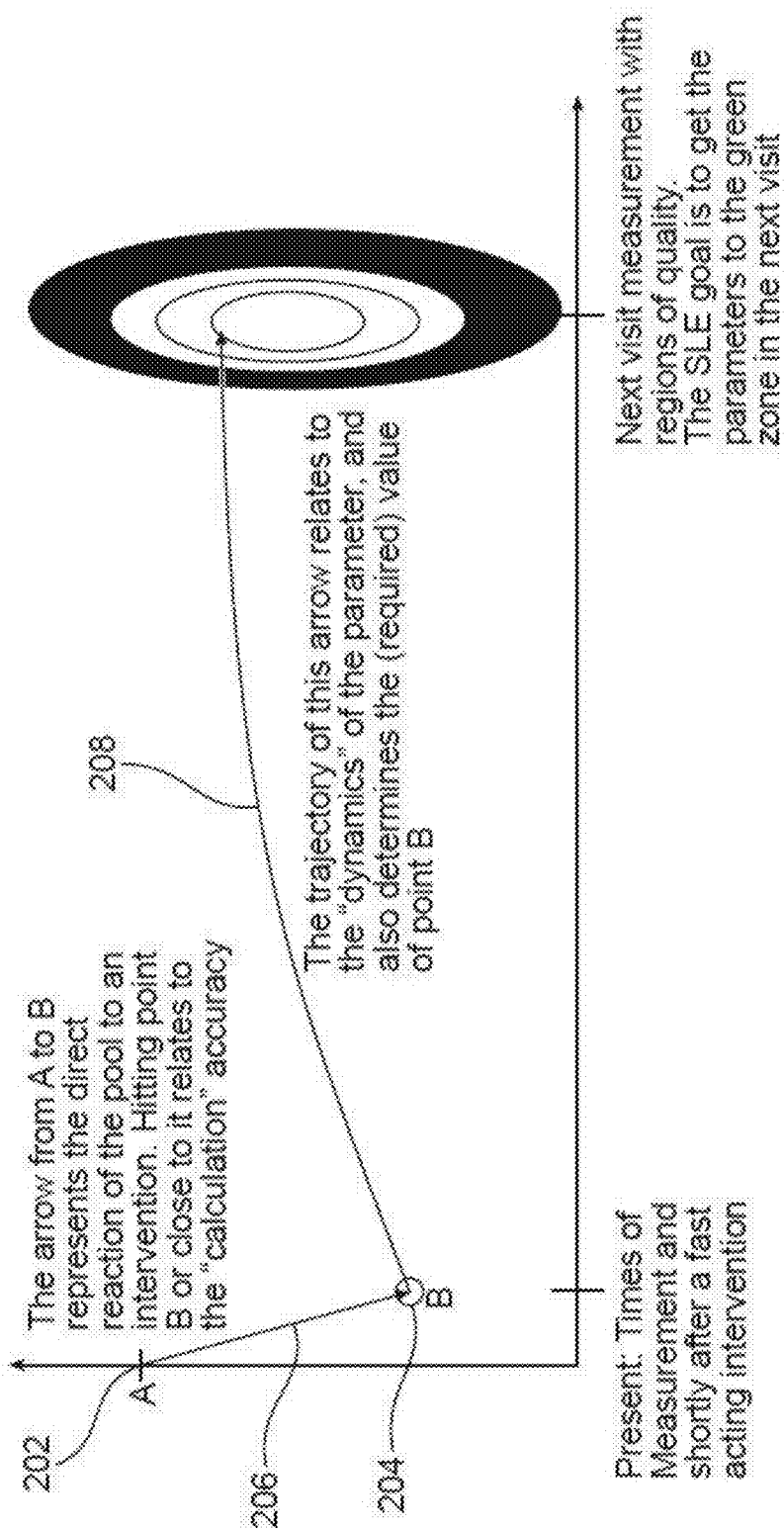
FIG. 13 illustrates the type of calculation and dynamics carried out by the SLE to provide output recommendations for adding the necessary chemicals to keep a pool properly balanced and disinfected.

An example illustrating the calculation and dynamics carried out by the SLE to provide output recommendations for adding the necessary chemicals to make sure the pool will be properly balanced and disinfected is shown in FIG. 13.

As seen in FIG. 13, point A 202 represents the value of a parameter such as FC, pH, CYA, TA, CH, and Salinity in the swimming pool at t=t0, t0 is the time when the substance is added to the pool.

Based on the simulated "dynamics" of said parameter in a specific swimming pool, the SLE produces a desired trajectory of the "dynamics" which represent the change over time of the parameter which reflects the quantity of the changes in added substance overtime during predefined time period ending at point B. i.e., arrow 208, of said parameter and calculates the required value of point B 204 which entails such trajectory, i.e., calculates the amount of chemicals to be added to the pool at the beginning of the a predefined period for setting the required value of point B at the end of the pre-defined period.

Point B 204 represents the value of that parameter in the pool after a fast acting intervention, i.e., after adding chemical(s) to the pool, at t=t1, and arrow 206 represents the direct reaction of a pool to the intervention.

In accordance with some embodiments of the present invention, hitting point B or close to it relates to the "calculation" accuracy.

Thus, the SLE calculates the amount of the chemical(s) to be added to the pool to set the value of said parameter to point B 204, and thus, to set the "dynamics" of said parameter in a way that will ensure keeping the value of said parameter within a predefined limiting range at the end of a predefined time duration.

As seen in the figure, the dynamic calculations carried by the SLE enable keeping the value of said parameter within the desired inner (green) zone at the end of a predefined time duration.

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing". "estimating", "selecting", "ranking", "grading". "calculating", "determining". "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs. EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order: a computer program product comprising a computer useable medium having computer readable program code, such as executable code, having embodied therein, and/or including computer readable program code for performing, any or all of the steps of any of the methods shown and described herein, in any suitable order: any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

The invention claimed is:

1. A method for monitoring, analysis and maintenance of swimming pools, said method comprising:
for each swimming pool:
receiving sensor data from at least one sensor located inside or in a vicinity of the swimming pool;
receiving non-sensory data from at least one source, said non-sensory data being pertinent at least to planned activities, said planned activities pertain at least to a predicted number of pool occupants predicted to be in the swimming pool; and
applying one or more machine learning algorithms, configured to analyze the received sensor data and non-sensory data, of the swimming pools, for obtaining an optimal policy of maintenance of the swimming pool for a predefined future period, based on analysis of the received sensor data and non-sensory data, also including the predicted number of pool occupants, wherein the optimal policy comprises one or more maintenance actions and schedules thereof; and
performing the one or more maintenance actions of the optimal policy of the swimming pool, by controlling operation of one or more instruments of the swimming pool, according to maintenance actions and schedules thereof as set in the optimal policy of the swimming pool.

2. The method of claim 1 further comprising providing, for each of the swimming pools, a local processing unit configured at least to receive the sensor data of the swimming pool and transmit the sensor data of the swimming pool to one or more remote servers,
wherein the one or more remote servers are configured to receive, for each of the swimming pools, their corresponding sensor data and non-sensory data, and to adjust and apply the one or more machine learning algorithms.

3. The method of claim 1, wherein the non-sensory data is pertinent to at least one of:
required maintenance procedures of the swimming pool,
location and environmental conditions of the swimming pool, and
online weather forecast and/or climatic data associated with the location of the swimming pool.

4. The method of claim 1 further comprising one or more of:
for each swimming pool, providing recommendations, or control parameters for operation of each instrument of the swimming pool based on the-optimal policy of the swimming pool;
providing, for at least one user, an online interface to access said recommendations and/or control parameters for each one of the swimming pools.

5. The method of claim 4, wherein said online interface accommodating at least one of:
access to a comprehensive presentation of a specific maintenance status and water quality parameters of a specific swimming pool from the swimming pools,
notifications of status of a specific swimming pool from the swimming pools,
warnings of malfunction, and/or recommendations for actions,
recommendations for pool maintenance actions,
prioritization of each recommended maintenance action,
access to a database of pool statistics, and
training and management of pool maintenance personnel to accomplish an optimal pool maintenance policy, in view of big data accumulated from multiple pool sites.

6. The method of claim 4, wherein the recommendations/control parameters for each one of the swimming pools include at least one of: values for adding chemical or biological substances, and recommendation for maintenance of repairing or replacing pool system equipment or instruments.

7. The method of claim 1 wherein the optimal policy of a specific swimming pool from the swimming pools, includes a predefined target range of values of pool chemical and/or biological parameters.

8. The method of claim 7 further comprising correcting rates for closing chemical or biological substances, based on new reported events, by calculating an influence of said new reported events on a balance of chemical and biological parameters.

9. A system for monitoring, analysis and maintenance of swimming pools, the system comprising at least:
(i) at each swimming pool:
at least one sensor configured to sense at least one characteristic of the swimming pool and output sensor data associated with the at least one characteristic of the swimming pool; and
at least one local processing unit; and
(ii) at least one server remotely located from each of the at least one local processing unit of each of the swimming pools, the at least one server being configured at least to:
receive sensor data from the at least one sensor of each of the swimming pools;
receive non-sensory data pertaining to each of the swimming pools, said non-sensory data of a specific swimming pool from the swimming pools, being pertinent at least to planned activities in the specific swimming pool, wherein said planned activities pertain at least to a predicted number of pool occupants predicted to be in the specific swimming pool for at least one given time period; and apply one or more machine learning algorithms, configured to analyze the received sensor data and non-sensory data, of each one of the swimming pools, for obtaining, for each swimming pool an optimal policy of maintenance of the swimming pool for a predefined future period, based on analysis of the received sensor data and non-sensory data of each of the swimming pools also including a predicted number of pool occupants of the swimming pool, wherein the optimal policy of each of the swimming pools comprises one or more maintenance actions and schedules thereof, for maintenance of the swimming pool by controlling one or more instruments of the swimming pool.

10. The system of claim 9, wherein the at least one server is also configured to operate, a user interface configured for:
enabling users to access a comprehensive presentation of a maintenance status and/or water quality parameters of at least one of the swimming pools,
presenting and/or sending of notifications of pool status of at least one of the swimming pools,
presenting and/or sending warnings of malfunction, and recommendations for actions,
pool maintenance actions priorities of at least one of the swimming pools,
enabling users to access to a database of pool statistics, for each swimming pool, and
training and management of pool maintenance personnel to accomplish an optimal pool maintenance policy, in view of big data accumulated from multiple pool sites.

11. The system of claim 9, wherein the at least one local processing unit of the specific swimming pool from the swimming pools is configured to receive and transmit to the at least one server the sensor data and/or the non-sensory data and/or analysis results of analysis of the received sensor data and/or non-sensory data of the specific swimming pool, the at least one server located remotely from the specific swimming pool, wherein the received sensor data, non-sensory data and/or analysis results of the specific swimming pool are transmitted by the local processing unit of the specific swimming pool to the at least one server in a continuous and/or periodic manner.

12. The system of claim 9, wherein each optimal policy of the specific swimming pool from the swimming pools, for a specific future time period, includes recommendations for maintenance of the specific swimming pool, the recommendations pertaining to at least one of: recommendations for values for adding chemical and/or biological substances, and/or recommendations for repairing or replacing instruments or equipment of the specific swimming pool.

13. The system of claim 12, wherein the optimal policy for maintenance of the specific swimming pool for a predefined future period is defined according to one or more predefined target ranges of values of pool chemical and biological parameters.

14. The system of claim 12 further comprising a decision module configured for correcting the values for adding chemical or biological substances, based on new reported events, by calculating an influence of one of said new reported events on balance of pool chemical and biological parameters.

15. A system for monitoring, analysis and maintenance of at least one swimming pool, said system comprising:
at least one sensor for each swimming pool, each sensor being configured to sense at least one characteristics of a specific swimming pool; and
at least one processing unit configured at least for:
for each swimming pool:
receiving sensor data from the at least one sensor of the swimming pool;
receiving non-sensory data from at least one source, said non-sensory data being pertinent at least to planned activities pertaining to the swimming pool, said planned activities pertain at least to a predicted number of pool occupants predicted to be in the swimming pool for at least one given time period; and
applying one or more machine learning algorithms, configured to analyze the received sensor data and non-sensory data, of the swimming pool, for obtaining an optimal policy of maintenance of the swimming pool for a predefined future period, based on analysis of received sensor data and non-sensory data, also including the predicted number of pool occupants of the swimming pool, wherein the optimal policy comprises one or more maintenance actions and schedules thereof; and
performing the one or more maintenance actions of the optimal policy of the swimming pool, by controlling operation of one or more instruments of the swimming pool, according to maintenance actions and schedules thereof as set in the optimal policy of the swimming pool.

* * * * *